(12) United States Patent
Campbell et al.

(10) Patent No.: US 11,546,875 B2
(45) Date of Patent: *Jan. 3, 2023

(54) NETWORK CONNECTION OUTAGE PREDICTION FOR COMMERCIAL PASSENGER VEHICLE

(71) Applicant: Panasonic Avionics Corporation, Lake Forest, CA (US)

(72) Inventors: Alan Campbell, Trabuco Canyon, CA (US); Dennis Rilea, Foothill Ranch, CA (US); Hanbin Liu, Orinda, CA (US); Anand Desikan, San Ramon, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/039,712

(22) Filed: Sep. 30, 2020

(65) Prior Publication Data

US 2022/0104167 A1    Mar. 31, 2022

(51) Int. Cl.
*H04W 64/00* (2009.01)
*H04W 4/42* (2018.01)
*H04W 4/24* (2018.01)
*H04W 4/024* (2018.01)
*H04M 15/00* (2006.01)

(52) U.S. Cl.
CPC ......... *H04W 64/006* (2013.01); *H04W 4/024* (2018.02); *H04W 4/24* (2013.01); *H04W 4/42* (2018.02); *H04M 15/8033* (2013.01)

(58) Field of Classification Search
CPC ..... H04W 64/006; H04W 4/024; H04W 4/24; H04W 4/42; H04M 15/8033
See application file for complete search history.

(56) References Cited

U.S. PATENT DOCUMENTS

| | | |
|---|---|---|
| 2003/0233658 A1 | 12/2003 | Keen et al. |
| 2005/0254430 A1* | 11/2005 | Clark ............... H04L 45/28 370/241 |
| 2006/0293040 A1* | 12/2006 | Kortge ............. H04L 67/12 455/418 |
| 2017/0103342 A1* | 4/2017 | Rajani ............. G06N 20/00 |
| 2019/0215230 A1* | 7/2019 | Mermoud ......... H04L 41/16 |

(Continued)

FOREIGN PATENT DOCUMENTS

WO    WO-2019043286 A1 *    3/2019    .......... G01C 21/005

*Primary Examiner* — Tejis Daya
(74) *Attorney, Agent, or Firm* — Perkins Coie LLP

(57) ABSTRACT

A system for predicting an outage for a commercial passenger vehicle is described. The system includes a storage configured to store travel information of an upcoming travel by the commercial passenger vehicle that is configured to provide a network connectivity for devices in the commercial passenger vehicle to remote devices; and a server configured to process the travel information and generate an output indicative of a probability of an outage of the network connectivity based on the travel information of the upcoming travel, and wherein the server is further configured to apply a machine learning algorithm that (1) processes the travel information based on history information related to a planned route to be taken during the upcoming travel and regulation information related to the upcoming travel and (2) determines the probability of the outage along the planned route.

20 Claims, 13 Drawing Sheets

(56) References Cited

U.S. PATENT DOCUMENTS

| | | | |
|---|---|---|---|
| 2019/0253328 A1* | 8/2019 | Kolar | H04L 43/045 |
| 2020/0168086 A1* | 5/2020 | Rakshit | H04W 4/44 |
| 2020/0396787 A1* | 12/2020 | Brugman | H04W 4/40 |
| 2021/0029599 A1* | 1/2021 | Hassan | G08G 1/096816 |
| 2021/0075871 A1 | 3/2021 | Mohr et al. | |
| 2022/0104167 A1 | 3/2022 | Campbell et al. | |

* cited by examiner

Tail Blockage By Latitude and Longitude
Showing top 5000 in Latitude, Longitude and Top 287 in Tail Blockage Details

Tail Blockage Distribution By Beam

Tail Blockage Distribution By Take Off Date

NETWORK CONNECTION OUTAGE PREDICTION FOR COMMERCIAL PASSENGER VEHICLE

TECHNICAL FIELD

This document relates to network outage prediction schemes for a commercial passenger vehicle such as an airplane, a passenger train, a commercial bus, a cruise ship, and others.

BACKGROUND

Many commercial airplanes have individualized video and audio entertainment systems, often referred to as "inflight entertainment" or "IFE" systems. Such systems may also be referred to as "inflight entertainment and communication" systems as well, and typically abbreviated as "IFEC" systems. The IFEC systems typically use an antenna system to interface with a satellite for sending and receiving content. Interruptions of services in using the IFEC system can been caused due to outages that affect communication resources available for the commercial passenger vehicle.

SUMMARY

Various implementations of the disclosed technology relate to outage prediction schemes for a commercial passenger vehicle. Some embodiments of the disclosed prediction schemes allow to predict a network service outage that can happen on a commercial passenger vehicle and avoid and/or prepare for a service outage, thereby improving passenger experience during a travel.

In one representative aspect, a system for predicting an outage for a commercial passenger vehicle is described. The system includes a storage configured to store travel information of an upcoming travel by the commercial passenger vehicle that is configured to provide a network connectivity for devices in the commercial passenger vehicle to remote devices; and a server configured to process the travel information and generate an output indicative of a probability of an outage of the network connectivity based on the travel information of the upcoming travel, and wherein the server is further configured to apply a machine learning algorithm that (1) processes the travel information based on history information related to a planned route to be taken during the upcoming travel and regulation information related to the upcoming travel and (2) determines the probability of the outage along the planned route.

In another representative aspect, a method for predicting an outage for a commercial passenger vehicle is described. The method includes receiving travel information of an upcoming travel of the commercial passenger vehicle that is configured to provide a network connectivity for devices in the commercial passenger vehicle; and performing, based on the travel information, a prediction of an outage of the network connectivity by determining probabilities of any of a weather-related outage caused due to a weather condition during the upcoming travel, a polar outage caused near a polar area, or a tail-blockage caused of a certain position of a tail of the commercial passenger vehicle relative to a satellite.

In another representative aspect, an apparatus for providing an outage prediction for a passenger on a commercial passenger vehicle is described. The apparatus is located in the commercial passenger vehicle and comprises: an onboard server in communication with a ground server and configured to (1) receive, from the ground server, outage prediction information about a probability of an outage that is predicted to occur along a route of a travel and affects a network connectivity for devices in the commercial passenger vehicle to remote devices outside of the commercial passenger vehicle and (2) provide the outage prediction information to the passenger in the commercial passenger vehicle; and a personal electronic device in communication with the onboard server and configured to receive the outage prediction information from the onboard server.

The above and other aspects and their implementations are described in greater detail in the drawings, the descriptions, and the claims.

DETAILED DESCRIPTION

Figure 1:
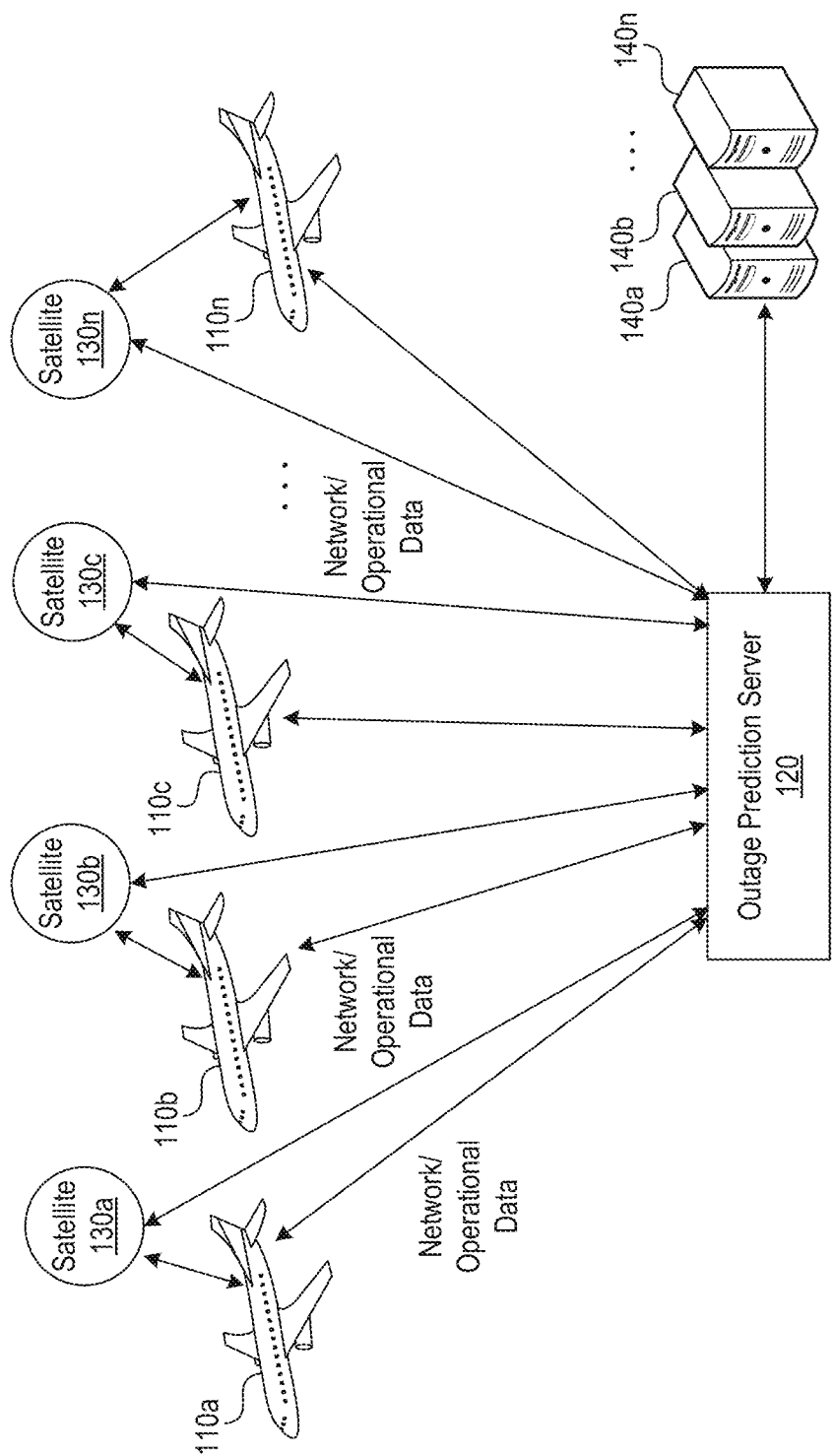
FIG. 1 shows an example of a configuration of an outage prediction system based on some implementations of the disclosed technology.

In recent years, portable user devices such as tablets, mobile phones and laptops that offer wired or wireless connectivity have proliferated. Passengers on commercial vehicles such as an airplane, a train or a bus have begun using their portable devices for entertainment and productivity and look for data connectivity during their travel. As a result, new technologies have been developed that offer network connectivity to passenger devices during travel.

Due to mobility of commercial passenger vehicles, however, several technical challenges exist for offering network connectivity. For example, passenger devices on the commercial passenger vehicle may connect to the internet or the world wide web through an on-board communication device. In other words, the on-board communication device may act as a gateway and no direct communication from the passenger devices to the internet may be possible. In many cases, due to electrophysical reasons, connectivity outage simply cannot be avoided. For examples, airplanes often fly in remote regions, e.g., polar flights, where there is simply no communication infrastructure available for data connectivity. In such cases, although outages cannot be completely prevented, passengers and operators of the commercial passenger vehicles would still find it beneficial to be able to predict probable occurrence of such outages in near future in order to plan their activities accordingly. Here, an outage may mean a temporary disruption in service that may occur at a physical layer e.g., a loss of a physical signal that carries data communication or a severe degradation in the carrier signal to a point where too many errors occur in received or transmitted data. The outage may also occur at a higher layer such as data link layer due to data errors e.g., inability to correct errors using conventional schemes such as error correction codes and cyclic redundancy checks.

The techniques disclosed in this document can be used by various embodiments to provide outage prediction schemes for predicting a possible outage occurring during a travel on a commercial passenger vehicle. The outage affects a network connectivity between devices in the commercial passenger vehicle and remote devices and the outages occurring during the travel on the commercial passenger vehicle can cause interruptions of services that are provided using network connectivity, e.g., the in-flight entertainment system.

There are some connectivity requirements for aircraft communications, for example, to use in-flight entertainment (IFE) equipment. For example, passengers streaming or downloading movies, multi-media contents, text messages, and others, would need reliable connectivity between, for example, their seatback monitor, personal electronic devices (PEDs) (e.g., smartphone, laptops, or tablets). Similarly, passengers may be using their PED to shadow or share content on a display screen of the seatback monitor. As discussed further in the present document, an IFE connectivity may suffer due to various connectivity issues, and there is no way in conventional technologies to accurately predict or obtain a priori information about an outage occurrence during a scheduled travel of the commercial passenger vehicle.

FIG. 1 shows an example of a configuration of an outage prediction system based on some implementations of the disclosed technology. In FIG. 1, the outage prediction server 120 is located at a ground and communicates with aircrafts 110a to 110n, satellites 130a to 130n, and external servers 140a to 140n. Each of the plurality of aircrafts 110a to 110n includes an IFE system that records operational and network data from antenna position sensors. The antenna position sensors can be located, for example, on the aircraft, at a ground terminal, a local base station, an airport communication tower, or others. The operational and network data includes a type (kind) of aircraft, a position of aircraft, a present aircraft flight route/course, a present direction of flight of planes in the fleet, a future direction of flight of planes in the fleet, an antenna position, an aircraft angle of flight, an aircraft destination information, an aircraft and or a fleet of prior, current, and future traffic patterns, flight course terrain (e.g., mountains, towers, lakes, oceans, historical communication signal drop-off locations, or others). The operational and network data is used by the outage prediction server 120 to optimize antenna beam usage to predict, to reduce, and/or to provide "early warning" of service interruptions.

In each aircraft, an edge server can communicate with an outage prediction server 120 via an antenna directly or through satellites 130a to 130n. Although the outage prediction server 120 is shown in FIG. 1 as being located on the ground, the outage prediction server 120 can be located in the cloud or at a remote location. The outage prediction server 120 can collect operational and network data from the aircrafts 110a to 110n and satellites 130a to 130n, and further collect additional data including past, present, and future aircraft and fleet data from external servers 140a to 140n. The external servers 140a to 140n may be located outside of the aircrafts and communicates with the ground terminal over the Internet, wired, or wireless networks using a variety of communication protocols.

Figure 2:
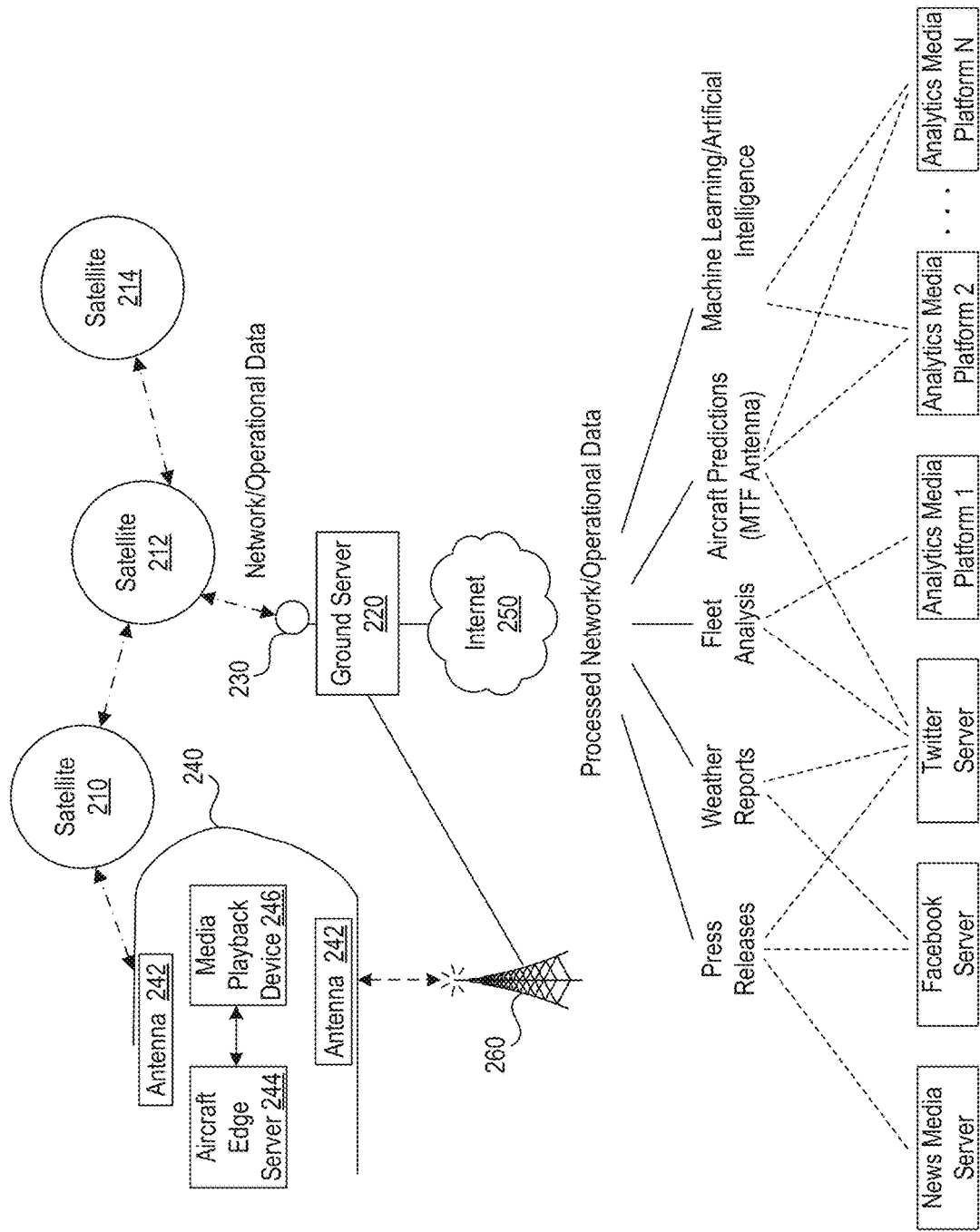
FIG. 2 shows another example of a configuration of an outage prediction system based on some implementations of the disclosed technology.

FIG. 2 shows another example of a configuration of an outage prediction system based on some implementations of the disclosed technology. In the example of FIG. 2, some elements of the aircraft 240 are shown, which include antennas 242, a media playback device 240, an aircraft edge server 244. The media playback device 246 is in communication with an edge server 244 and the aircraft 240 is in communication with a ground server 220 through an antenna 242 (on aircraft 528) via one or more satellites 210, 212, 214 and/or a terrestrial communication station 260. For the communications between the ground server 220 and the aircraft 240, a ground server antenna 230 is further provided. The ground server 220 can retrieve network/operational data from the aircraft 240 using communication links through the antenna 242, one or more satellites 210, 212, 240, the ground server antenna 230, and/or the terrestrial communication station 260. In addition, the ground server 220 can be communicably coupled to the Internet 250 to retrieve processed network/operational data. The Internet 250 is the example only and other communication protocols can be used to enable the communications between the ground server 220 and additional servers/platforms.

As shown in FIG. 2, the processed network/operational data includes press releases, weather reports, fleet analysis, aircraft predictions, or machine learning/artificial intelligence. To obtain the processed network/operational data, the ground server 220 can be further in communication with various servers/platforms including news media server, social media server (e.g., Facebook or Twitter servers), one or more analytics media platforms. The machine learning/artificial intelligence module is employed to cooperate with the ground server 220 to provide the processed network/operational data obtained from various servers/platforms. The various servers/platforms can operate as sources of various data that is related to a travel by a commercial passenger vehicle and provide any related information such as weather reports, fleet information, aircraft information, etc., to the ground server 220 (and/or the machine learning/artificial intelligence module). Such data can be utilized by the ground server 220 (and/or the machine learning/artificial intelligence module) to perform the outage prediction. Although it is shown in FIG. 2 that the machine learning/artificial intelligence module is implemented outside of the ground server 220, it is also possible that the ground server 220 is configured to include the machine learning/artificial intelligence module.

The machine learning/artificial intelligence (AI) module includes machine learning applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the machine learning/AI module may enable the ground server 220 to perceive their environment and take actions that maximize their prediction results for service outages. The machine learning/AI module may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI module can abstract away and automate the low-level mechanics of AI, and the machine learning/AI module can manage and automate much of the lower level complexities of working with AI. Each program developed in a pedagogical programming language can be fed into the machine learning/AI module in order to generate and train appropriate intelligence models. The machine learning/AI module can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties. In some embodiments, the machine learning/artificial intelligence module employs algorithms to predict an outage that affects a network connectivity during a travel by a commercial passenger vehicle based on various information. In some implementations, the machine learning/artificial intelligence module further suggests recommendations for beam usages/teleport usages/satellite usages to reduce and prevent possible outage occurrences. For example, the outage prediction system can map or chart patterns of satellite usage, and select a different satellite to mitigate outage occurrences during flights. In some implementations, the machine learning/artificial intelligence module further suggests modifications on a route of the travel based on prediction results of outages.

The ground server 220 can be configured to use a wide variety of resources including compute resources, storage resources, and other resources and predict a possible outage using various algorithms. For example, the ground server 220 operates to obtain information from news media server and/or social media servers and perform machine learning techniques to predict a service outage during a travel of the vehicle. For example, the ground server 220 can operate together with a teleport usage algorithm that predicts, documents (logs), and redirects teleport communication traffic to one or more best teleport beams based one or more factors including: historical weather data, live weather data, aircraft antenna positional information, aircraft antenna pointing angle, aircraft antenna line of sight measurements, feed-beam distribution patterns. While FIG. 2 shows the implementation that the outage prediction system is configured as the ground server 220, other implementations are also possible. For example, the outage prediction system can be configured in a cloud. In this case, the cloud platform for the outage prediction system exists with servers, processes, and databases, which are able to be connected connect over a wide area network, such as the Internet, from multiple computing devices and then the backend of the cloud platform is configured to handle the operations of the outage prediction system including operations discussed above for the ground server 220 in FIG. 2, by dynamically calling in additional computing hardware machines to load on and run the independent processes as needed.

Some embodiments of the disclosed systems and methods can be further configured to provide a result of an outage prediction in various manners. In some implementations, the outage prediction service can generate and provide an IFE outage map showing predicted future connectivity downtime, mapping predicted connectivity outages along the flight path including outage segments. In this case, the map shows all potential routes that will incur outages. The map is one example only and other implementations are also possible. For example, the outage prediction result can be provided using a list of possible outages. In some implementations, at least two other visualizations can be employed to provide the outage prediction result (for example, a map and a table or a listing of time intervals and corresponding outage probabilities).

The outage prediction result can be utilized in various manners. In some implementations, the outage prediction service can be used to adjust passenger Internet fees and service providers subscription fees and IFE advertisers' fees based on outage prediction information. In some implementations, the outage prediction service can be used to generate a warning and communicate the warning to passengers during a flight. In some implementations, the outage prediction service can be used to generate the prediction information and communicate the generated prediction information to aircraft companies and others before scheduled flights. In some implementations, the outage prediction service can further include recommendations about modifications of beam usages and/or redirecting of teleport communication traffics to avoid possible outage occurrences. In some implementations, the outage prediction service can be utilized by the Internet Service provider to prorate in-flight Internet usage service charges for Internet downtimes.

There can be various types of outages occurring during a travel of a commercial vehicle, e.g., tail blockage, polar outage, and weather-related outage, and the outage prediction systems and methods are configured to predict different types of outages. For predicting each of different typed outages, the system and method can employ different algorithms configured accordingly. Below is further discussion for each of different typed outages.

Tail Blockage Prediction

Figure 3:
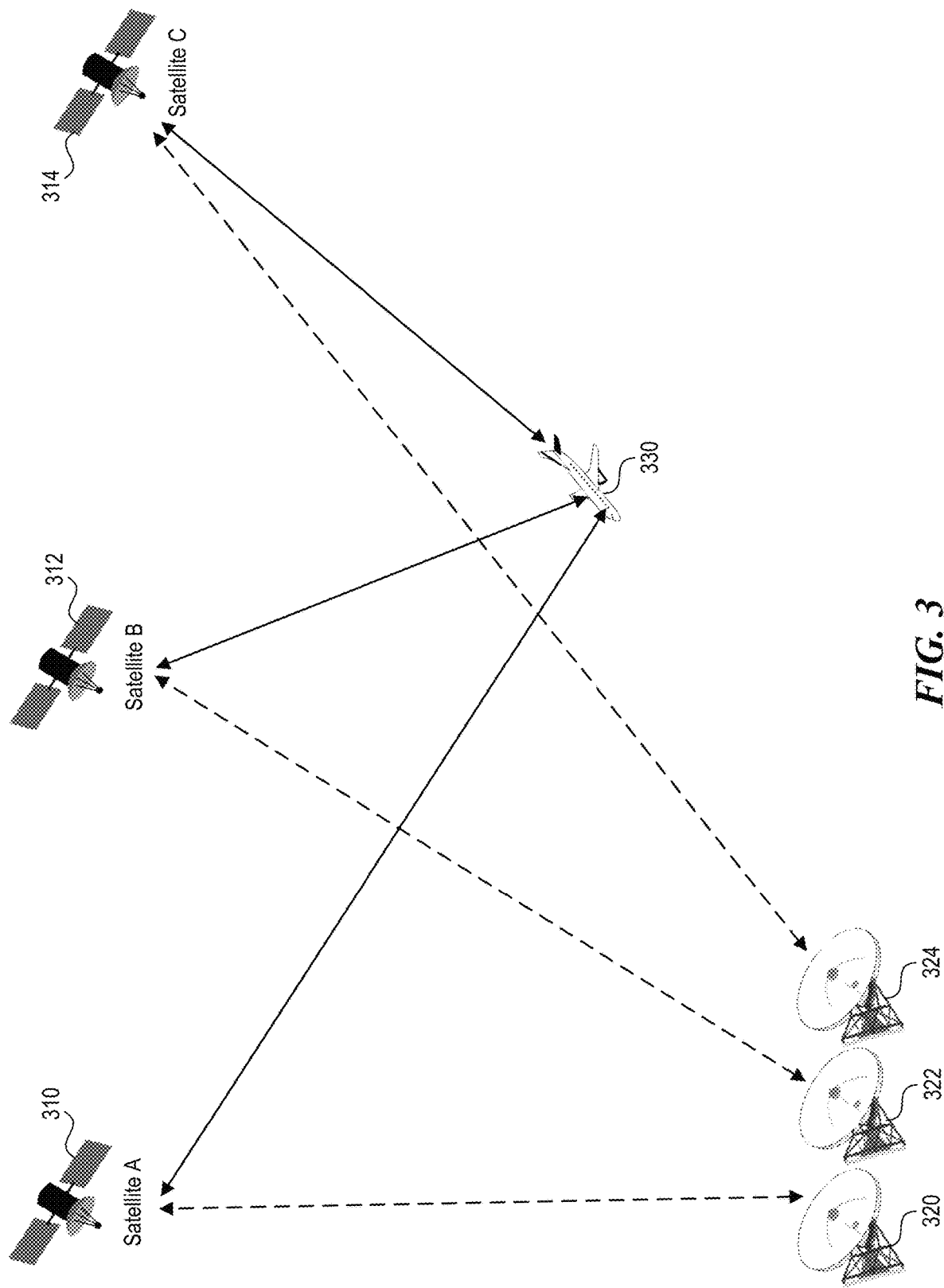
FIG. 3 shows an example of relative locations of an aircraft, a satellite and an antenna when a tail blockage occurs.

Some implementations of the disclose technology provide a tail blockage prediction. FIG. 3 illustrates an example of relative locations of an aircraft, a satellite and an antenna. In FIG. 3, the aircraft 330 communicates with satellite A 310, satellite B 312, satellite C 314, and antennas 320, 322, 324 to provide the vehicle entertainment system. The tail blockage occurs when a tail of the aircraft 330 is blocking a line of sight from an aircraft antenna to satellite C 314 because the tail of the aircraft 330 is in between the aircraft antenna and the satellite C 314. In FIG. 3, there is no tail blockage between the aircraft 330 and satellite A 310 or satellite B 312.

The tail blockage can be predicted when the aircraft tail is in between the aircraft antenna and any satellite available for each route. Thus, the tail blockage can occur when the aircraft is flying away from the satellite. In some cases, there may be multiple satellites available for a given route. In some other cases, there will be only one satellite for a route. All of the satellites that have capacity for a route will be used to predict the tail blockage. The outage prediction system may be configured to obtain data that is related to the tail blockage and determine the tail blockage using algorithms stored on the system. For example, the outage prediction system can predict the occurrence of the tail blockage using the conditions provided below.

Altitude: The calculation only includes aircraft altitudes >10,000 ft. Thus, locations on routes during a climb and descent will be excluded.

Azimuth: The azimuth indicates the horizontal angle of the aircraft relative to the satellite. An azimuth angle >176 degrees or <−176 degrees will likely cause some blockage of the signal.

Elevation: The elevation indicates the upward tilt (in degrees) of the antenna, relative to the orientation of the tail. The elevation is required to point the antenna at the satellite. A low elevation is more likely to incur tail-blockage. Elevation angles used for tail blockage are >=5 degrees and <40 degrees.

The outage prediction system can employ algorithms to predict the tail blockage occurrence based on conditions above. The outage prediction system may obtain flight data including altitude, azimuth, elevation before flights and can provide the prediction result before the flights. In some implementations, the outage prediction system can further provide recommendations to modify a travel route to reduce or avoid a possible outage occurrence. In some embodiments, the outage prediction system may use information about which equipment will be used for the planned travel. Depending on a configuration of antennas on the body of the equipment in relation to the tail of the aircraft, the outage prediction system may determine segments along a travel path during which there is a high probability (e.g., above a threshold such as 50%) of occlusion of a satellite by a tail intervening the connection between the satellite and antennas fitted on the aircraft body.

Figure 4:
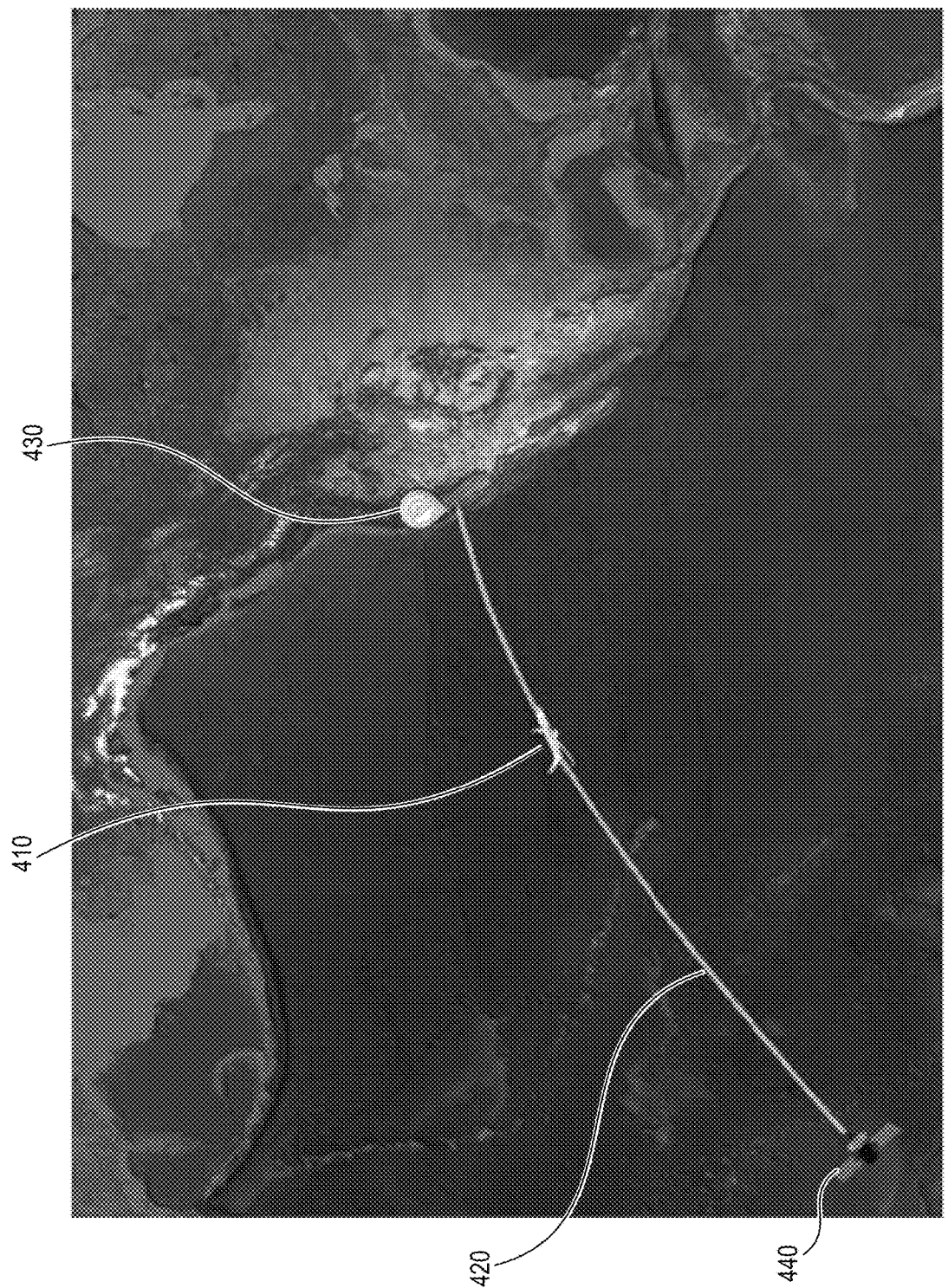
FIG. 4 shows an example of a flight route that experiences a tail blockage.

FIG. 4 shows an example of a route of an aircraft in which a tail blockage occurs. The example screen shown in FIG. 4 can be provided as the result of the prediction. In FIG. 4, an aircraft 410 travels along a route 420 to San Francisco International Airport (SFO) 430. The aircraft communicates with the satellite 440 for providing inflight services. Anywhere along the route 420 will likely experience some tail blockage because the satellite 440 is behind the aircraft 410 such that the tail of the aircraft 410 is located between the aircraft antenna and the satellite 440. Traveling away from the SFO 430 along the route 420, however, will not experience tail blockage because the satellite is in front of the aircraft.

The outage prediction system can calculate probabilities of tail-blockages on routes based on the history of latitude/longitude positions for the same route. Such history information can be stored in the cloud or any other locations. In addition to probabilities of tail-blockages, the algorithms also learn the probability of flights being impacted by tail-blockages and the percentage of in flight hours being impact by tail-blockages for impacted flights.

Figure 5:
FIG. 5 shows examples of prediction results indicating a tail blockage occurrence based on some implementations of the disclosed technology.
Figure 5:
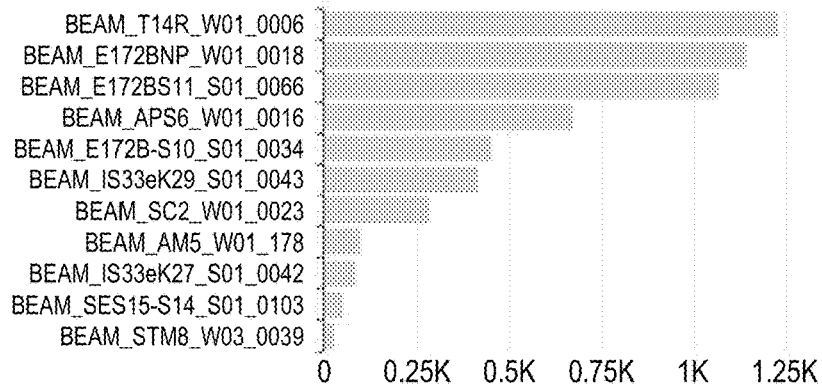
Figure 5:

FIG. 5 shows an example of a prediction result provided by the outage prediction system. In FIG. 5, the map 510 shows a tail blockage distribution by latitude and longitude, the chart 520 shows the tail blockage distribution by beam, and the chart 530 shows the tail blockage distribution by take-off date.

Polar Satellite Outage Prediction

Some implementations of the disclose technology provide a polar satellite outage prediction. The polar outage interruption can occur when an elevation is so low that the aircraft antenna cannot communicate a satellite signaling to the aircraft. In some implementations, the polar outage prediction is calculated using an algorithm predicting the polar outage prediction when the aircraft elevation is at a very high latitude (e.g., greater than 70 degrees N) and the elevation is very low (e.g., less than 5 degrees).

Figure 6:
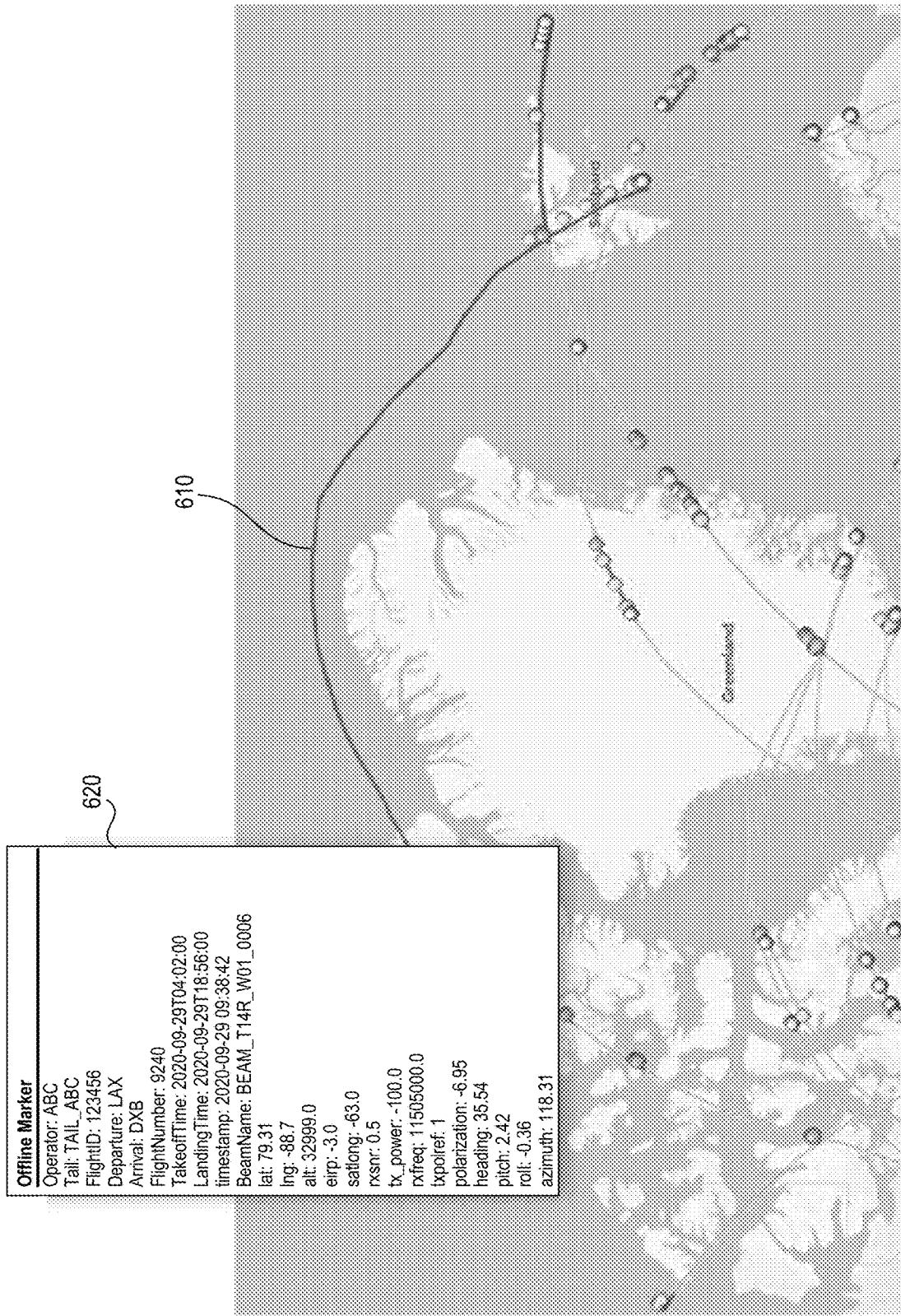
FIG. 6 shows an example of a flight route that experiences a polar outage.

FIG. 6 shows an example of a result that is provided as the polar satellite outage prediction. In FIG. 6, the result shows the map including various flight routes including a flight route 610 that is predicted to have a polar outage interruption. There can be many methods employed to display the flight route that is expected to have a polar outage interruption differently from other routes. There is information window 620 including detailed information about the flight route 610 that is predicted to have the polar outage interruption.

Elevation can be defined as the upward tilt to a satellite antenna measured in degrees and required to aim the antenna at the communications satellite. When aimed at the horizon, the elevation angle is zero. If it were tilted to a point directly overhead, the satellite antenna would have an elevation of 90 degrees. This can be considered as the angle from the aircraft to the satellite. With the Earth's curvature, elevation that is less than 5 degrees is typical in polar outages.

In some implementations, polar outages can be determined using the conditions below.

Altitude: The calculation only includes aircraft altitudes >10,000 ft. Thus, locations on routes during a climb and descent will be excluded.

Latitude: Restricting the calculations to latitudes >70 degrees N ensures no false positives as a result of aircraft maneuvers.

Elevation: The elevation indicates the upward tilt (in degrees) of the antenna, relative to the orientation of the tail. The elevation is required to point the antenna at the satellite. The plane typically cannot "see" the satellite at elevations that are less than 5 degrees.

The outage prediction system can employ algorithms to predict the polar outage occurrence based on conditions above. The outage prediction system may obtain data including altitude, latitude, elevation before a flight and can provide the prediction result before the flight.

Figure 7:
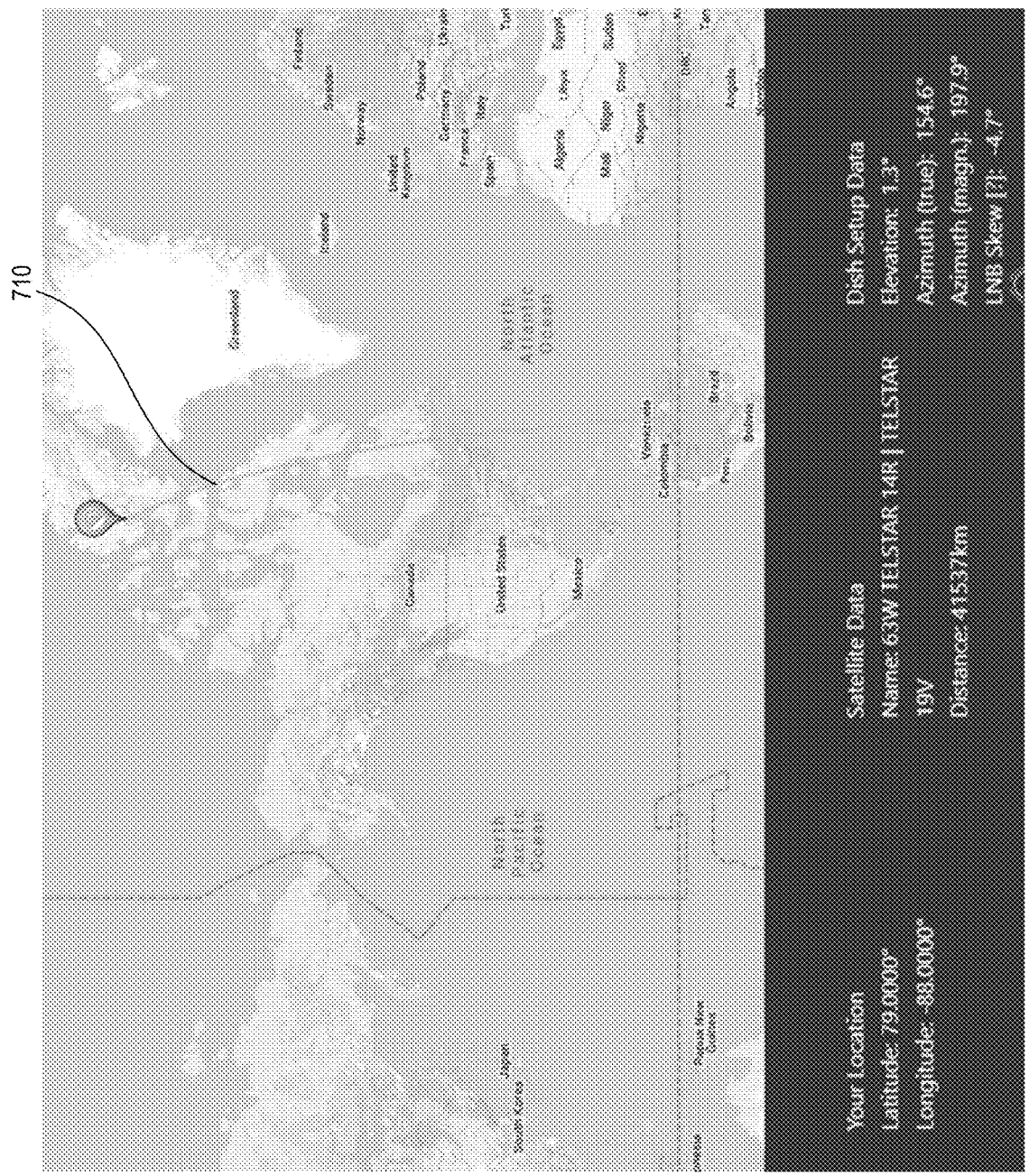
FIG. 7 shows another example of a flight route that experiences a polar outage.

FIG. 7 shows an example of data with very low elevation (1.3 degrees) at a typical latitude, longitude pairing (79N, 88W) that occurs during flight routes that cross the North Polar region e.g. a flight route from Los Angeles to Dubai.

In some implementations, the probabilities of polar outages on routes can be calculated by the history of latitude/longitude positions for the same route in the cloud. In addition to probabilities of polar outages, the algorithms also learn the probability of flights being impacted and the percentage of in flight hours being impacted by polar outages for impacted flights.

Two examples of a logic are shown in the below, which can be used to predict the polar outage prediction. The logic can be implemented by the outage prediction system through various algorithms.

The example logic, which is shown in Table 1, uses flight information data, for example, FCC (Federal Communications Commission) regulation data and/or flight history data, to predict a polar outage.

TABLE 1

| Math | Notes | Impacts QOE? |
|---|---|---|
| altitude: \>10000 AND in_network: 0 AND elevation: <=5 AND latitude: >70 | For Phase 1, to ensure accuracy/confidence in the model, binary/concrete polar outage can be used. (e.g., TRUE polar outages where it caused an out of network event, i.e., in_network = 0.) Altitude is gated as >10000 feet since there are obviously maneuvers on takeoff, which can be ignored. Elevation is the upward tilt to a satellite antenna measured in degrees required to aim the antenna at the communications satellite. When aimed at the horizon, the elevation angle is zero. If it were tilted to a point directly overhead, the satellite antenna would have an elevation of 90 degrees. Elevation <5 deg is typical in polar outages Latitude is fairly obvious: This "gate" can be added since some maneuvers at lower latitudes could cause elevation <5 deg but this would obviously not be a polar outage. | Yes - the tail is knocked out of network hence the passenger loses WiFi |

Another example logic predicts the polar outage using a satellite map. The satellite map has a polar outage definition bounded by geo-marker, e.g., "Zone" that is marked in the map. The example logic creates a table ordered with the worst route displayed in the first row and best route in the last row. The example logic can display 10 to 15 worst routes from actual polar outages data from offloads. Routes with only one flight need to be ignored and left out because it may skew the order.

Below is an example showing a few routes with the worst shown in the first row and best in the last row. The example logic will display the data shown in Table 2 below at a minimum.

TABLE 2

Top Routes Polar Outages Summary

| Route | % Polar Outage | % of Flights likely be affected | Flight Count on the Route | Flight Count affected | # of Records affected | # of Records | mean_perc_inflighttime_noservice |
|---|---|---|---|---|---|---|---|
| LAX-DXB | 14% | 80% | 25 | 21 | 3897 | 158900 | 0.1463 |
| DEL-EWR | 12% | 50% | 10 | 3 | 1045 | 11003 | 0.1276 |

The actual flight path (latitude/longitude points) of routes may change based on the time of year and season. So, the worst route may be different though out the year when using the same routes and satellites. In addition, there may be multiple beams per route with polar outage (although polar outages typically occur in T14R).

Weather-Related Outage Prediction

Some implementations of the disclose technology provide a weather-related outage prediction, given that weather impacts network connectivity between devices inside the vehicle and satellites.

Figure 8:
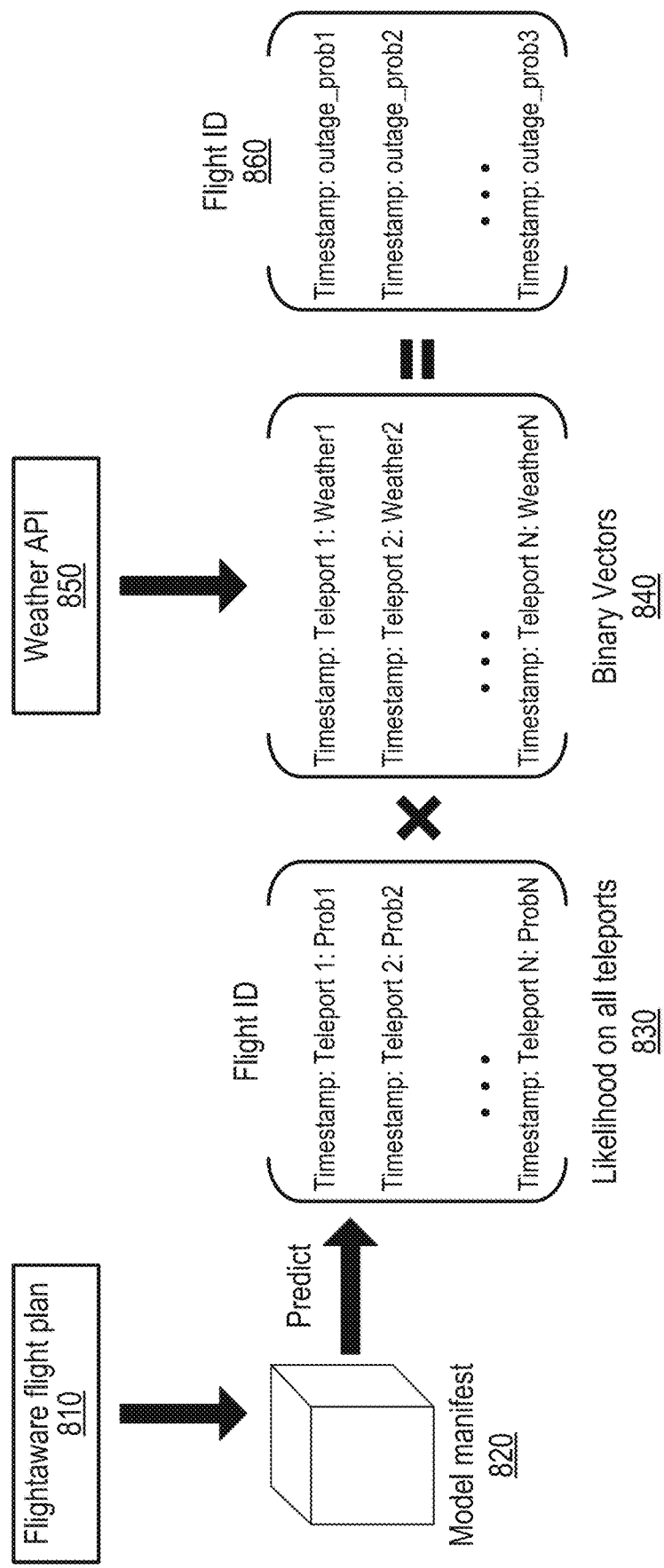
FIG. 8 shows an example of an algorithm that is used to predict a weather-related outage.

FIG. 8 shows an example of an algorithm that is used to predict the weather-related outage. In FIG. 8, flight data of a certain flight with a flight ID is input to an algorithm model. In FIG. 8, as the example, the flight plan from FlightAware is provided to the algorithm model. The flight data may include flight positions (e.g., Radar, ADS-B, Mode S Multilateration (MLAT), datalink, etc.) as well as flight status data (e.g., flight plans, departure/arrival messages, flight updates) and surface movement positions. The algorithm provides an outrage predict result for a corresponding flight ID using 1) likelihoods on all teleports and 2) binary vectors that are derived from a weather API. A teleport is a ground station designed for communications with satellites and teleports are located at multiple places around the globe allowing the teleports line of sight communication with satellites. The likelihood of teleport shows possibilities of a certain flight communicating with a corresponding teleport at a particular time. The obtaining of the likelihoods on all teleports will be further discussed later with regard to FIG. 10. The weather API may be configured to communicate with one or more external weather providers. The input from the weather API may facilitate integrating weather information (e.g., current weather data, weather forecasts, historical data, based on location and others).

Figure 9:
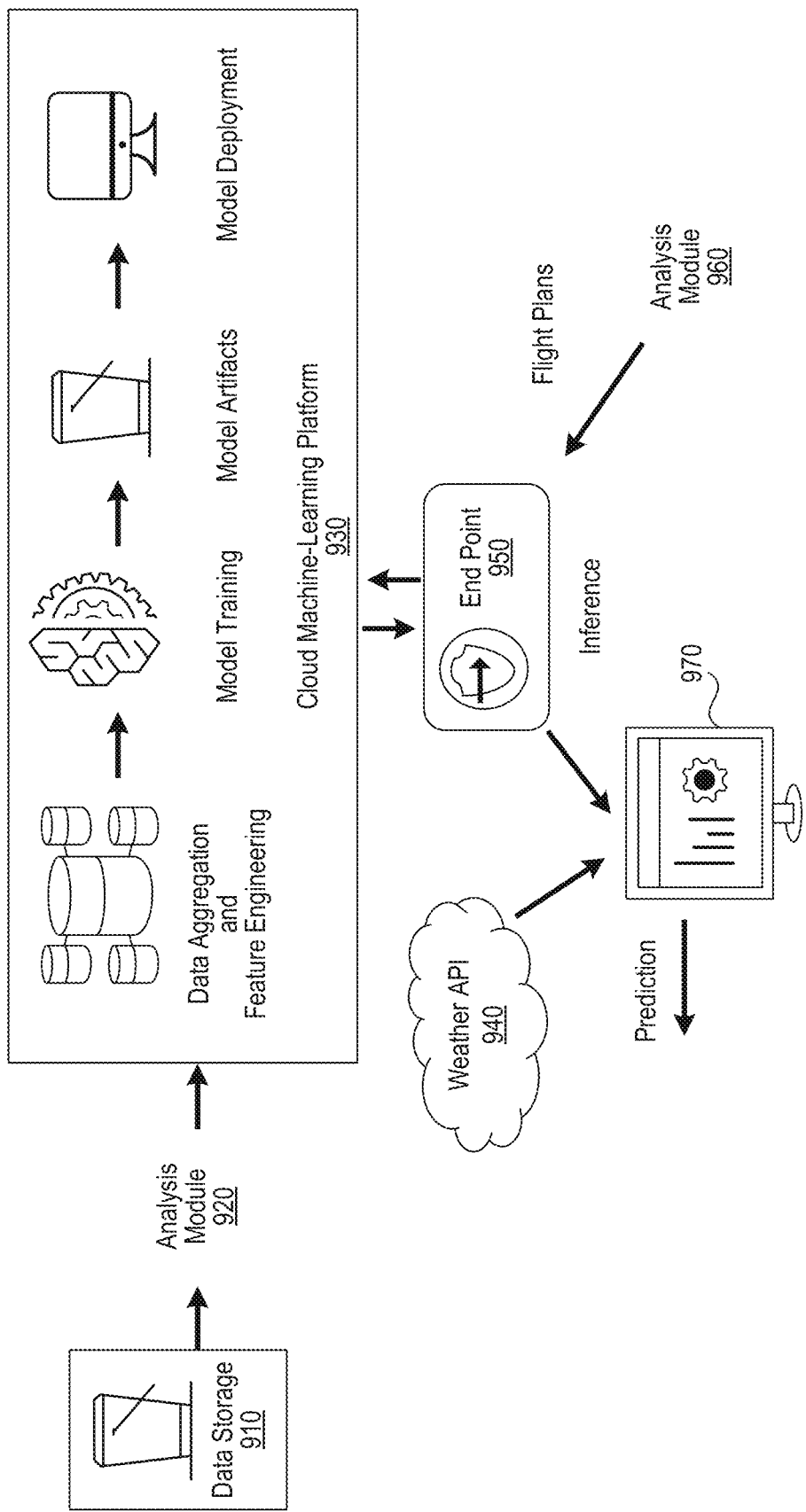
FIG. 9 shows an example of a deployment of an algorithm to predict a weather-related outage.

FIG. 9 shows an example of a deployment of an algorithm to predict the weather-related outage. The data storage 910 stores data that is related to an outage occurrence prediction, and data obtained from the data storage 910 is analyzed by algorithm(s)/model(s) 920. The cloud machine-leaning platform 930 receives the analyzed data from the block 920 and further process operations to predict an outage occurrence (e.g., data aggregation and feature engineering, model training, an application of model artifact, and/or an application of a model deployment). The result form the cloud machine-learning platform 930 is sent to the endpoint 950 to which flight data is sent from the analysis module 940. The prediction module 970 receives weather data from data storage e.g., weather API 940, as well as data from the endpoint 950 and outputs a prediction result. At least some of the components as shown in FIG. 9 can be executed either through custom programming and/or usage of standard or open source tools.

In some implementations, based on all collected or predicted weather information and current/predicted teleport usage, reconfiguring teleport usage before and/or during flight in real time is performed to maximize directly of teleport beams having none or minimal weather concerns with the aircraft antenna. In some implementations, current/predicted teleport usage includes adjusting usage in the air by nearby aircraft of the teleport beams and receiving and transmitting predictive information to and from a ground terminal.

Figure 10:
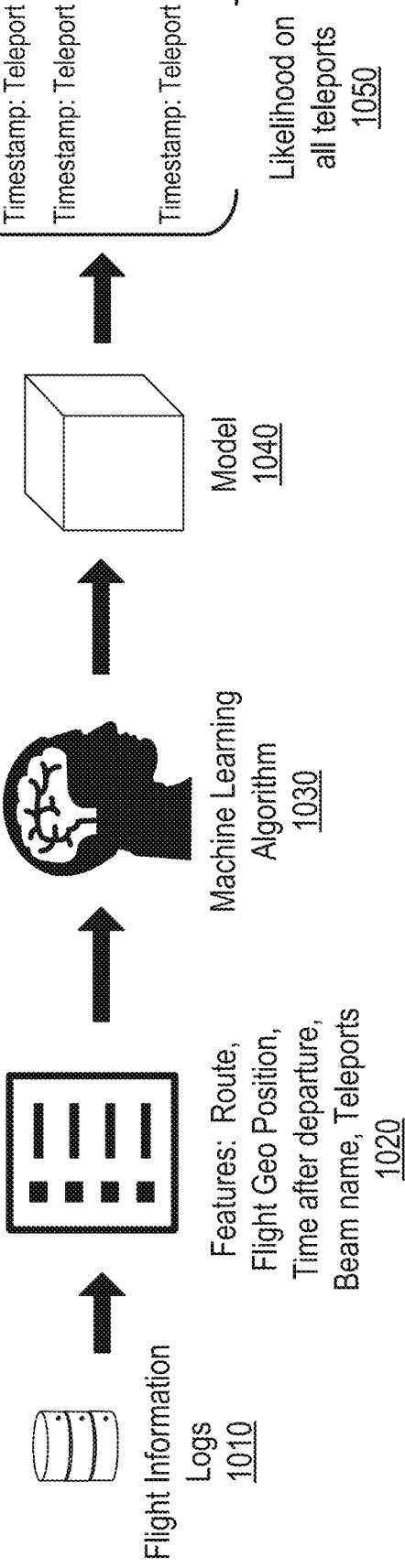
FIG. 10 shows an example of a prediction to obtain likelihoods of teleports.

FIG. 10 shows an example of a prediction to obtain likelihoods of teleports. As discussed with reference to FIG. 8, the likelihoods of teleports are used to predict the weather impact. In FIG. 10, flight information data is provided at 1010. At 1020, features including routes, flight geographic positions, beam names, teleports information, time information are retrieved from the flight information data. At 1030, the machine learning algorithm is applied and builds a model to interpret various data. At 1040, the model built by the machine learning algorithm is applied and as the output, the likelihood data is obtained at 1050.

Figure 11:
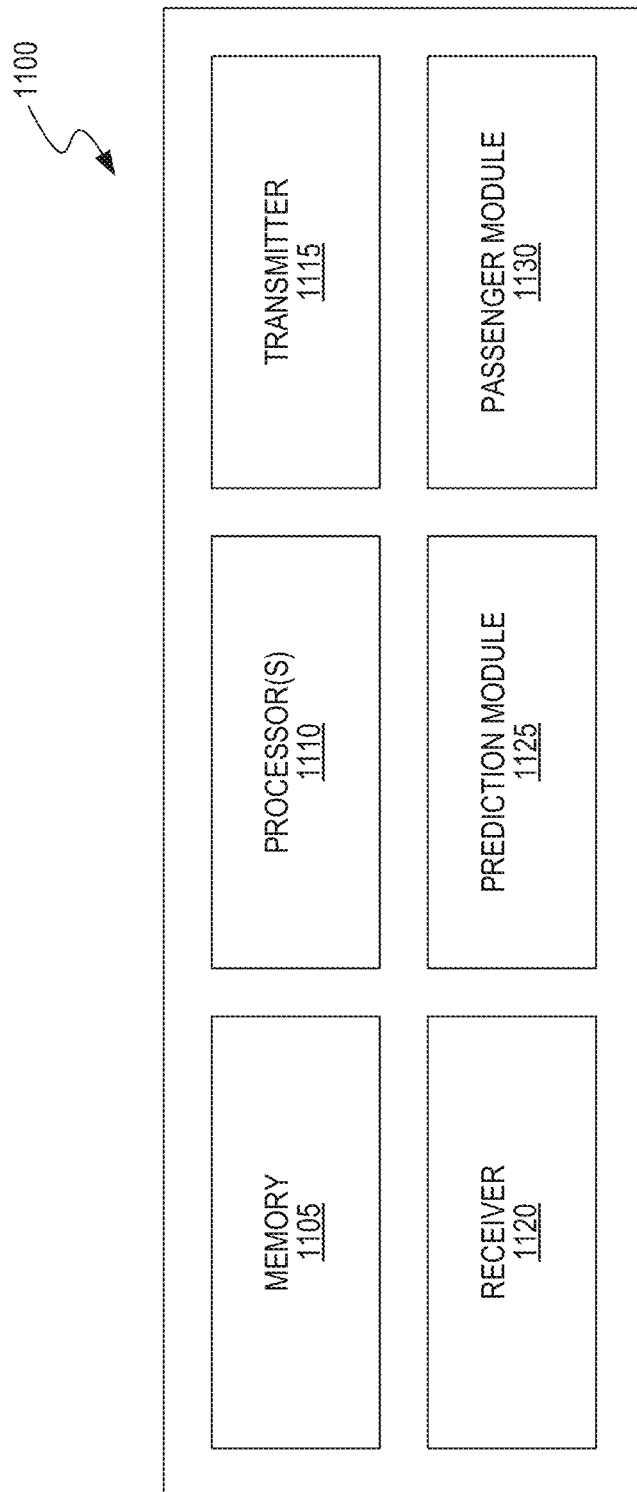
FIG. 11 shows an example of a block diagram of a ground server based on some implementations of the disclosed technology.
Figure 13:
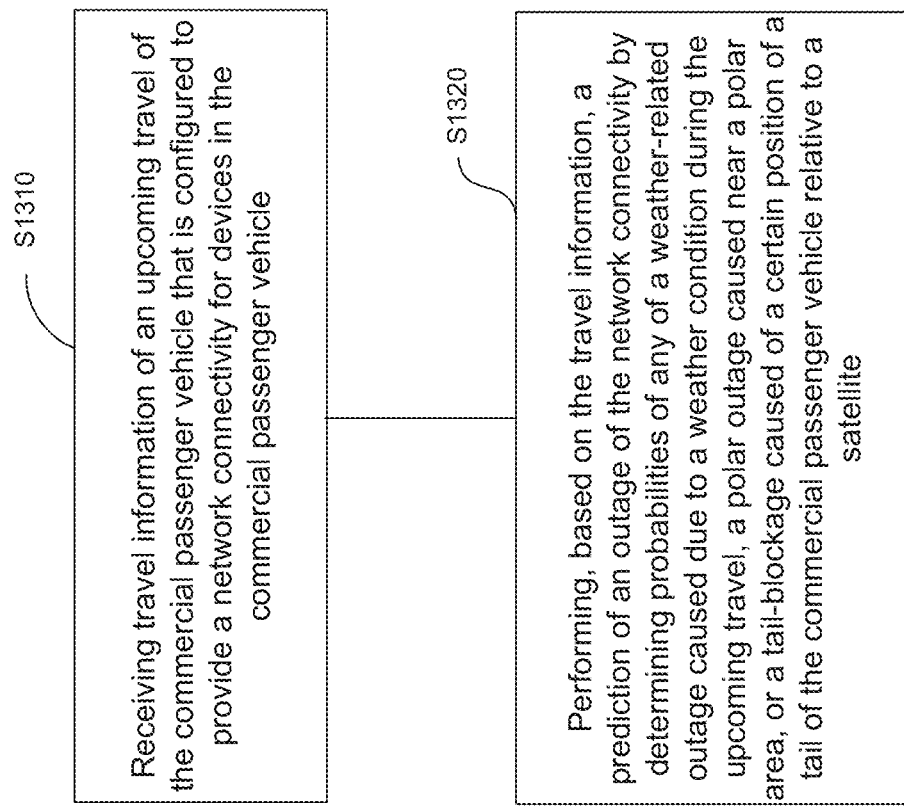
FIG. 13 shows a flowchart of an example method of a method for predicting an outage for a commercial passenger vehicle.

FIG. 11 shows an example of a block diagram of a ground server based on some implementations of the disclosed technology. The ground server is shown in FIG. 2 as the implementation of an outage prediction server. In FIG. 11, the ground server includes at least one processor 1110 and a memory 1105 having instructions stored thereupon. The memory 1105 may store instructions to be executed by the processor 1110. In other embodiments, additional, fewer, and/or different elements may be used to configure the ground server 1100. The memory 1105 is an electronic holding place or storage for information or instructions so that the information or instructions can be accessed by the processor 1110. The memory 1105 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 1110 configure the ground server 1100 to perform the operations (e.g., the operations, for example, as shown in FIG. 13) which will be described in this patent document. The instructions executed by the processor 1110 may be carried out by a special purpose computer, logic circuits, or hardware circuits. The processor 1110 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 1110 can perform the operations called for by that instruction. The processor 1110 operably couples with the memory 1105, transmitter, 1115, the receiver 1120, the prediction module 1125, and the passenger module 1130, etc. to receive, to send, and to process information and to control the operations of the ground server 1100. The processor 1110 may retrieve a set of instructions from a permanent memory device such as a ROM device and copy the instructions in an executable form to a temporary memory device that is generally some form of RAM. In some implementations, the ground server 1100 can include a plurality of processors that use the same or a different processing technology. The transmitter 1115 transmits or sends information or data to another device (e.g., other servers as shown in FIGS. 1 and 2). The receiver 1120 receives information or data transmitted or sent by another device (e.g., other servers as shown in FIGS. 1 and 2). The prediction module 1125 of the ground server 1100 is configured to perform operations to predict outage occurrence as discussed above. In some implementations, the prediction module 1125 can be configured as a part of the processor 1110. The passenger module 1130 of the ground server 1100 is configured to obtain information on passengers including names, prior travel histories, current travel information, any preselected movie list, preselected point of interests, interests, hobbies, etc. The passenger information can be obtained in multiple manners and stored in the passenger module 1130 and utilized to select and provide customized contents and/or other in-flight service purposes. The passenger information can be obtained by the airlines and/or by a third-party prior to boarding of a corresponding passenger.

Figure 12:
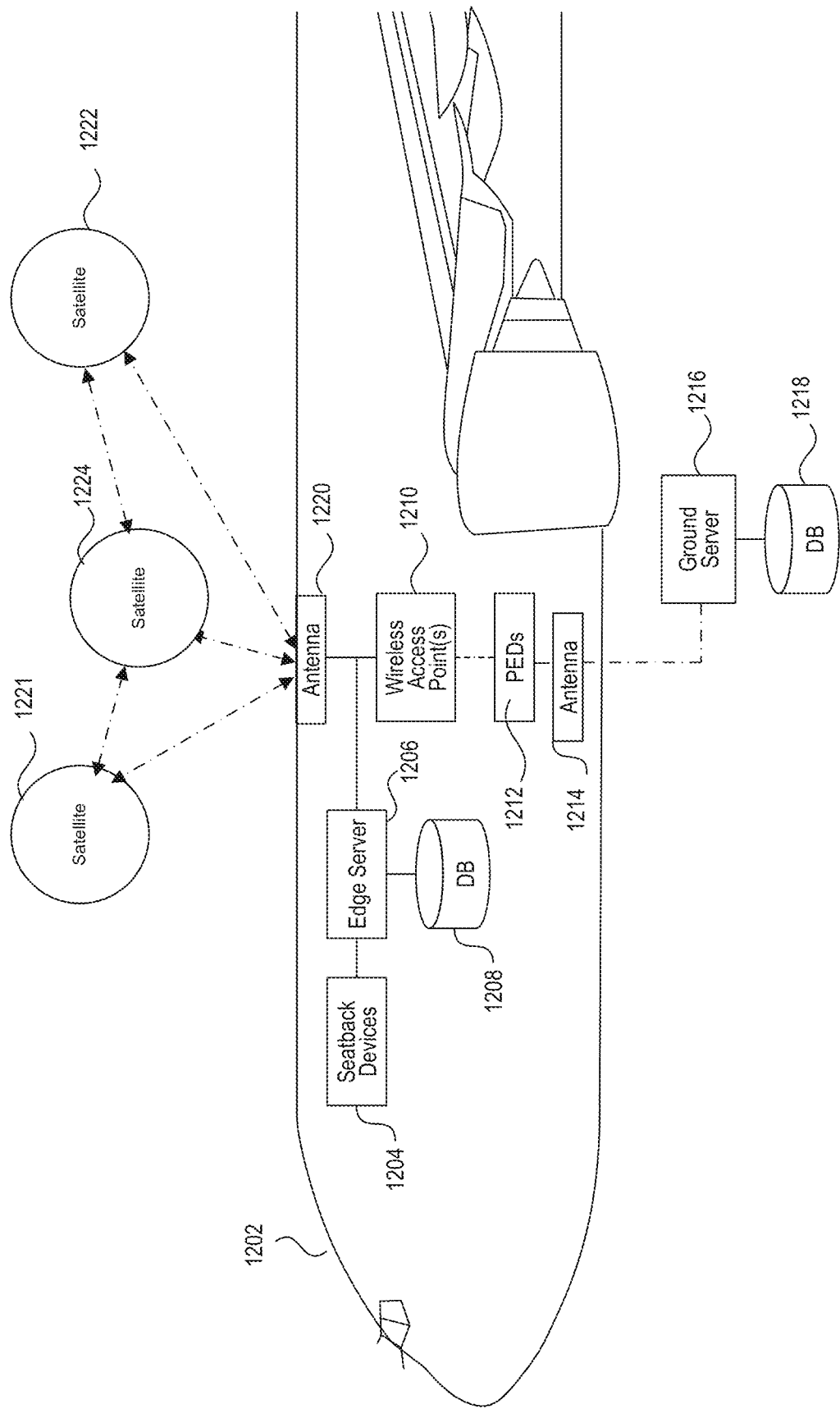
FIG. 12 shows an example of an in-flight entertainment system based on some implementations of the disclosed technology.

FIG. 12 shows an example of an in-flight entertainment system based on some implementations of the disclosed technology. In FIG. 12, the edge server 1206 may be in communication with another server, e.g., a ground server 1216 located on the ground (e.g., in an airport) via an antenna 1214. As discussed in FIG. 2, the ground server 1216 can operate as the outage prediction server. The ground server 1216 and the edge server 1206 can communicate to exchange data and information to assist the in-flight entertainment system to the seatback devices 1204 and PEDs 1212. For example, the edge server 1216 can obtain from the ground server 126 information about possible outage occurrence so that the edge server 1216 can, based on such information, provide information on a possible outage occurrence to passengers. In some implementations, the edge server 1216 can obtain such information about possible outage occurrences before a flight and store the information in a database 1208. The edge server 1216 may be configured to give an early notice of possible service interruptions to passengers based on the information about possible outage occurrences. In some implementations, such early notice can be made through a public announcement by a caption crew to every passengers. For the public announcement, the in-flight entertainment system prepares the audio and/or video contents corresponding to the possible service interruptions and distribute the audio and/or video to passengers through the seatback devices and/or PEDs. In some implementations, the edge server 1216 may be configured to use the information about possible outage occurrences to adjust service fees that are paid from customers based on service interruptions caused due to outage occurrences. Such early notification on possible outage occurrences can allow passengers on long flights to plan their internet usage and select an appropriate price package. The database 1218 may be coupled to the ground server 1216 and store data, e.g., processed network/operation data as shown in FIG. 2. The edge server 1206 can be in communication with a ground server 1216 through satellites 1221, 1222, and 1224 (for example, when at high altitude, flying over a body of water, or area where there is limited signaling from the ground) via an antenna 1220.

FIG. 13 shows a flowchart of an example method of a method for predicting an outage for a commercial passenger vehicle. At 1310, travel information of an upcoming travel of the commercial passenger vehicle is received. The commercial passenger vehicle is configured to provide a network connectivity for devices in the commercial passenger vehicle. In some implementations, the travel information may be received from sensors that are located on at least one of the commercial passenger vehicle, a ground terminal, or a network station. In some implementations, the travel information may include at least one of: a type of the commercial passenger vehicle, a position and an angle of the commercial passenger vehicle during the upcoming travel, a route of the commercial passenger vehicle, a direction of the travel, an antenna position, destination information, or terrain information during the travel. At 1302, a prediction of an outage of the network connectivity is performed based on the travel information. The prediction may be performed by determining probabilities of any of a weather-related outage caused due to a weather condition during the upcoming travel, a polar outage caused near a polar area, or a tail-blockage caused of a certain position of a tail of the commercial passenger vehicle relative to a satellite.

In some implementations, the performing the prediction includes applying a machine learning algorithm that (1) processes the travel information based on history information related to a planned route to be taken during the upcoming travel and regulation information related to the upcoming travel and (2) determines the probability of the outage along the planned route.

In some implementations, the method may further comprise: transmitting a result of the prediction to the commercial passenger vehicle. In some implementations, the method may further comprise: provide a suggestion to modify a planned usage of a communication resource including at least one of an antenna, a satellite, or a ground station communicating with the satellite based on a result of the prediction. In some implementations, the method may further comprise: receiving weather information related to the upcoming travel to determine the probabilities of the weather-related outage.

This patent document describes the exemplary vehicle entertainment systems in the context of a commercial passenger vehicle such as an airplane for ease of description. The exemplary vehicle entertainment systems could be employed in other types of commercial passenger vehicle such as a train, a ship, or a bus. Depending on the type of a commercial passenger vehicle, available types of outages to be predicted can be different. The network outage prediction system can operate to predict outages available to the commercial passenger vehicle based on the type of the commercial passenger vehicle.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for predicting an outage for a commercial passenger vehicle, comprising:
   a storage configured to store travel information of an upcoming travel by the commercial passenger vehicle that is configured to provide a network connectivity for devices in the commercial passenger vehicle to remote devices; and
   a server configured to process the travel information and generate an output indicative of a probability of an outage of the network connectivity based on the travel information of the upcoming travel, and
   wherein the server is further configured to apply a machine learning algorithm that processes the travel information based on history information related to a planned route to be taken during the upcoming travel and regulation information related to the upcoming travel, the machine learning algorithm further determining the probability of any of weather-related outage caused due to a weather condition during the upcoming travel, a polar outage caused near a polar area, or a tail-blockage caused of a certain position of a tail of the commercial passenger vehicle relative to a satellite, and
   wherein the machine learning algorithm is applied to determine probabilities of the polar outage and the tail-blockage based on a predefined condition that is related to an altitude, an elevation, or a latitude of the commercial passenger vehicle in the planned route to be taken during the upcoming travel.

2. The system of claim 1, wherein the server includes an engine configured to perform the machine learning algorithm.

3. The system of claim 1, wherein the server is coupled to an external engine configured to perform the machine learning analysis and located outside of the server.

4. The system of claim 1, wherein the machine learning algorithm is further configured to provide a suggestion to modify a planned usage of a communication resource including at least one of an antenna, a satellite, or a ground station communicating with the satellite or the planned route based on the probability of the outage.

5. The system of claim 1, wherein the travel information includes at least one of: a type of the commercial passenger vehicle, a position and an angle of the commercial passenger vehicle during the upcoming travel, a route of the commercial passenger vehicle, a direction of the travel, an antenna position, destination information, or terrain information during the travel.

6. The system of claim 1, wherein the server is further configured to receive weather information related to the upcoming travel and the probability of the outage is determined further based on the weather information.

7. The system of claim 1, wherein the server is further configured to transmit the output to the commercial passenger vehicle.

8. The system of claim 1, wherein the server is configured to generate the output by visualizing a portion of the planned route that is predicted to have the outage using a map.

9. A method for predicting an outage for a commercial passenger vehicle, comprising:
receiving travel information of an upcoming travel of the commercial passenger vehicle that is configured to provide a network connectivity for devices in the commercial passenger vehicle; and
performing, based on the travel information, a prediction of an outage of the network connectivity by determining probabilities of any of a weather-related outage caused due to a weather condition during the upcoming travel, a polar outage caused near a polar area, or a tail-blockage caused of a certain position of a tail of the commercial passenger vehicle relative to a satellite,
wherein the performing the prediction includes applying a machine learning algorithm that processes the travel information based on history information related to a planned route to be taken during the upcoming travel and regulation information related to the upcoming travel, the machine learning algorithm further determining the probabilities of any of the weather-related outage, the polar outage, or the tail-blockage, and
wherein the machine learning algorithm is applied to determine probabilities of the polar outage and the tail-blockage based on a predefined condition that is related to an altitude, an elevation, or a latitude of the commercial passenger vehicle in the planned route to be taken during the upcoming travel.

10. The method of claim 9, further comprising:
transmitting a result of the prediction to the commercial passenger vehicle.

11. The method of claim 9, further comprising:
providing a suggestion to modify a planned usage of a communication resource including at least one of an antenna, a satellite, or a ground station communicating with the satellite based on a result of the prediction.

12. The method of claim 9, wherein the travel information is received from sensors that are located on at least one of the commercial passenger vehicle, a ground terminal, or a network station.

13. The method of claim 9, wherein the travel information includes at least one of: a type of the commercial passenger vehicle, a position and an angle of the commercial passenger vehicle during the upcoming travel, a route of the commercial passenger vehicle, a direction of the travel, an antenna position, destination information, or terrain information during the travel.

14. The method of claim 9, further comprising:
receiving weather information related to the upcoming travel to determine the probabilities of the weather-related outage.

15. A system for providing an outage prediction for a passenger on a commercial passenger vehicle, the system located in the commercial passenger vehicle and comprising:
an onboard server in communication with a ground server and configured to receive, from the ground server, using communication links through an antenna via one or more satellites, outage prediction information about a probability of an outage that is predicted to occur along a route of a travel and affects a network connectivity for devices in the commercial passenger vehicle to remote devices outside of the commercial passenger vehicle, the onboard server further configured to provide the outage prediction information to the passenger in the commercial passenger vehicle; and
a personal electronic device in communication with the onboard server through wired or wireless networks provided in the commercial passenger vehicle and configured to receive the outage prediction information from the onboard server, and
wherein the onboard server is further configured to adjust service fees that are charged for services requiring the network connectivity based on the outage prediction information.

16. The system of claim 15, wherein the onboard server is further configured to provide an announcement of the outage prediction information during the travel to a passenger in the commercial passenger vehicle.

17. The system of claim 15, further comprising a database disposed in the commercial passenger vehicle to be in communication with the onboard server and configured to store the outage prediction information.

18. The system of claim 15, wherein the outage prediction information is obtained using a machine learning algorithm that processes travel information based on history information related to a planned route to be taken during the travel and regulation information related to the travel.

19. The system of claim 18, wherein the machine learning algorithm determines any of weather-related outage caused due to a weather condition during the travel, a polar outage caused near a polar area, or a tail-blockage caused of a certain position of a tail of the commercial passenger vehicle relative to a satellite.

20. The system of claim 18, wherein the machine learning algorithm determines probabilities of the polar outage and the tail-blockage based on a predefined condition that is related to an altitude, an elevation, or a latitude of the commercial passenger vehicle in the planned route to be taken during the travel.

* * * * *